(12) United States Patent
Shao et al.

(10) Patent No.: US 11,715,156 B1
(45) Date of Patent: Aug. 1, 2023

(54) RISK ASSESSMENT METHODS AND SYSTEMS FOR AFFORDABLE HOUSING APPLICATION IN A SMART CITY BASED ON INTERNET OF THINGS

(71) Applicant: CHENGDU QINCHUAN IOT TECHNOLOGY CO., LTD., Sichuan (CN)

(72) Inventors: Zehua Shao, Chengdu (CN); Bin Liu, Chengdu (CN); Yaqiang Quan, Chengdu (CN); Yong Li, Chengdu (CN); Xiaojun Wei, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 17/817,984

(22) Filed: Aug. 6, 2022

(30) Foreign Application Priority Data

Jul. 13, 2022 (CN) .......................... 202210818219.7

(51) Int. Cl.
*G06Q 40/00* (2023.01)
*G06Q 40/03* (2023.01)
*G06Q 50/26* (2012.01)

(52) U.S. Cl.
CPC ............. *G06Q 40/03* (2023.01); *G06Q 50/26* (2013.01)

(58) Field of Classification Search
CPC ................................ G06Q 40/03; G06Q 50/26
(Continued)

(56) References Cited

U.S. PATENT DOCUMENTS 11,216,508 B2 * 1/2022 Brave ................... G06Q 10/00
11,587,436 B1 * 2/2023 Shao .................... G08G 1/0145
(Continued)

FOREIGN PATENT DOCUMENTS

CN 105743751 A 7/2016
CN 108399509 A 8/2018
(Continued)

OTHER PUBLICATIONS

White Paper on Urban Brain Development, Smart City Standard Working Group of National Beacon Commission, 2022, 59 pages.
(Continued)

*Primary Examiner* — Mike Anderson
*Assistant Examiner* — Mohammed H Mustafa
(74) *Attorney, Agent, or Firm* — Metis IP LLC

(57) ABSTRACT

This present disclosure provides a risk assessment method and system for affordable housing application in a smart city based on Internet of Things. The risk assessment method is executed by the management platform, and the risk assessment method includes obtaining a query request for a risk of the affordable housing application from the service platform, wherein the query request is generated by the user platform based on an input of the affordable housing application by an applicant through the user platform; in response to the query request, through a management sub-platform corresponding to the management platform and a service sub-platform corresponding to the service platform, obtaining relevant information of the applicant and his/her related persons thereof, and determining the risk of the affordable housing application of the applicant; and sending the risk of the affordable housing application to the service platform.

12 Claims, 5 Drawing Sheets

(58) Field of Classification Search
USPC .................................................. 705/4, 35–45
See application file for complete search history.

(56) References Cited

U.S. PATENT DOCUMENTS

| | | | | |
|---|---|---|---|---|
| 2014/0129420 | A1* | 5/2014 | Howe | G06Q 50/01 |
| | | | | 705/38 |
| 2017/0124645 | A1* | 5/2017 | Kortina | G06Q 40/03 |
| 2017/0169508 | A1* | 6/2017 | Song | G06Q 20/223 |
| 2019/0147515 | A1* | 5/2019 | Hurley | G06Q 20/3821 |
| | | | | 705/44 |
| 2020/0193666 | A1* | 6/2020 | Cinnamon | G06T 7/62 |
| 2020/0294642 | A1* | 9/2020 | Bostic | G16H 50/20 |
| 2021/0383037 | A1* | 12/2021 | Segev | G06F 30/18 |
| 2022/0129871 | A1* | 4/2022 | Rodgers | G06Q 20/108 |
| 2022/0343059 | A1* | 10/2022 | Bowen | G06Q 30/018 |

FOREIGN PATENT DOCUMENTS

| | | | | |
|---|---|---|---|---|
| CN | 109191072 | A | 1/2019 | |
| CN | 111738892 | A | 10/2020 | |
| CN | 112349100 | A | 2/2021 | |
| CN | 109934752 | B | 8/2021 | |
| CN | 113256163 | A | 8/2021 | |
| CN | 113806546 | A * | 12/2021 | ............. G06F 16/35 |
| CN | 115098508 | A * | 9/2022 | ............. G06F 16/22 |

OTHER PUBLICATIONS

Rao, Ziyun et al., Recommendation Methods and Systems Using Knowledge Graph, Acta Automatica Sinica, 47(9): 2061-2077, 2021.
First Office Aciion in Chinese Appiication No. 202210818219.7 dated Aug. 24, 2022, 18 pages.
Decision to Grant a Patent for Invention in Chinese Application No. 202210816219.7 dated Sep. 27, 2022, 8 pages.

* cited by examiner

300

```
┌─────────────────────────────────────────────────────┐
│ The management platform obtains a query request    │
│ for the risk of the affordable housing application │    310
│ from the service platform, and the query request is│
│ generated by the user platform based on the         │
│ affordable housing application input by an applicant│
│ through the user platform.                          │
└─────────────────────────────────────────────────────┘
                          │
                          ▼
┌─────────────────────────────────────────────────────┐
│ In response to the query request, the management    │
│ platform obtains the relevant information of the    │    320
│ applicant and his/her related persons through the   │
│ management sub-platform corresponding to the        │
│ management platform and the service sub-platform    │
│ corresponding to the service platform, and          │
│ determining the risk of the affordable housing      │
│ application of the applicant.                       │
└─────────────────────────────────────────────────────┘
                          │
                          ▼
┌─────────────────────────────────────────────────────┐
│ The management platform sends the risk of the       │    330
│ affordable housing application to the service       │
│ platform.                                            │
└─────────────────────────────────────────────────────┘
```

FIG. 3

RISK ASSESSMENT METHODS AND SYSTEMS FOR AFFORDABLE HOUSING APPLICATION IN A SMART CITY BASED ON INTERNET OF THINGS

CROSS-REFERENCE TO RELATED APPLICATIONS

This application claims priority to Chinese Patent Application No. CN202210818219.7, filed on Jul. 13, 2022, the entire contents of which are hereby incorporated by reference.

TECHNICAL FIELD

This present disclosure relates to the field of the Internet of Things, in particular to a risk assessment method and system for affordable housing application in a smart city based on the Internet of Things.

BACKGROUND

Housing demand is related to people's livelihood, and the rapid social and economic development is accompanied by rising housing prices. Especially in urban areas, there are many poor people who need the assistance of social affordable housing to solve the housing needs. Some non-poor people use false information to apply for affordable housing, which wastes social affordable housing resources, and the truly poor person would not be helped.

The Internet of Things is an important part of the new generation of information technology. It is an extension and expansion network based on the Internet. It is a huge network formed by combining various information and networks to realize the interconnection of people, machines and things at any time, any place. This provides a technical foundation for cities with dense population and different levels of rich and poor of population. Through the Internet of Things technology, it is of great significance to design a risk assessment system for an affordable housing application based on the Internet of Things technology.

Therefore, combined with the Internet of Things technology, a risk assessment method and system for an affordable housing application in a smart city based on the Internet of Things is provided to achieve accurate risk assessment of an affordable housing application for an applicant.

SUMMARY

The present disclosure provides a risk assessment method for affordable housing application in a smart city based on the Internet of Things, which is realized by a risk assessment system for affordable housing application. The system includes a user platform, a service platform and a management platform, the method being executed by the management platform, and the method includes: obtaining a query request for a risk of the affordable housing application from the service platform, wherein the query request is generated by the user platform based on an input of the affordable housing application by an applicant through the user platform; in response to the query request, through a management sub-platform corresponding to the management platform and a service sub-platform corresponding to the service platform, obtaining relevant information of the applicant and his/her related persons, thereof, and determining the risk of the affordable housing application of the applicant; the management platform adopting different management sub-platforms for data storage, data processing and/or data transmission; wherein the different management sub-platforms correspond to different information sources; and sending the risk of the affordable housing application to the service platform.

This present disclosure provides a risk assessment system for affordable housing application in a smart city based on the Internet of Things, comprising a user platform, a service platform, and a management platform; the service platform is used to obtain a query request for a risk of the affordable housing application from the service platform, wherein the query request is generated by the user platform based on an input of the affordable housing application by an applicant through the user platform; the management platform is used to, in response to the query request, through a management sub-platform corresponding to the management platform and a service sub-platform corresponding to the service platform, obtain relevant information of the applicant and related persons thereof, and determine the risk of the affordable housing application of the applicant; the management platform adopting different management sub-platforms for data storage, data processing and/or data transmission; wherein the different management sub-platforms correspond to different information sources; and send the risk of the affordable housing application to the service platform.

This present disclosure provides a non-transitory computer-readable storage medium, comprising a set of instructions, wherein when executed by at least one processor, the computer implements a risk assessment method for affordable housing application in a smart city based on the Internet of Things.

BRIEF DESCRIPTION OF THE DRAWINGS

The present disclosure is further described in terms of exemplary embodiments. These exemplary embodiments are described in detail with reference to the drawings. These embodiments are not limited, in these embodiments, the same number denote the same structure, wherein:

FIG. 3 is an exemplary flowchart illustrating a risk assessment method for of affordable housing application in a smart city based on the Internet of Things according to some embodiments of the present disclosure;

DETAILED DESCRIPTION

Figure 1:
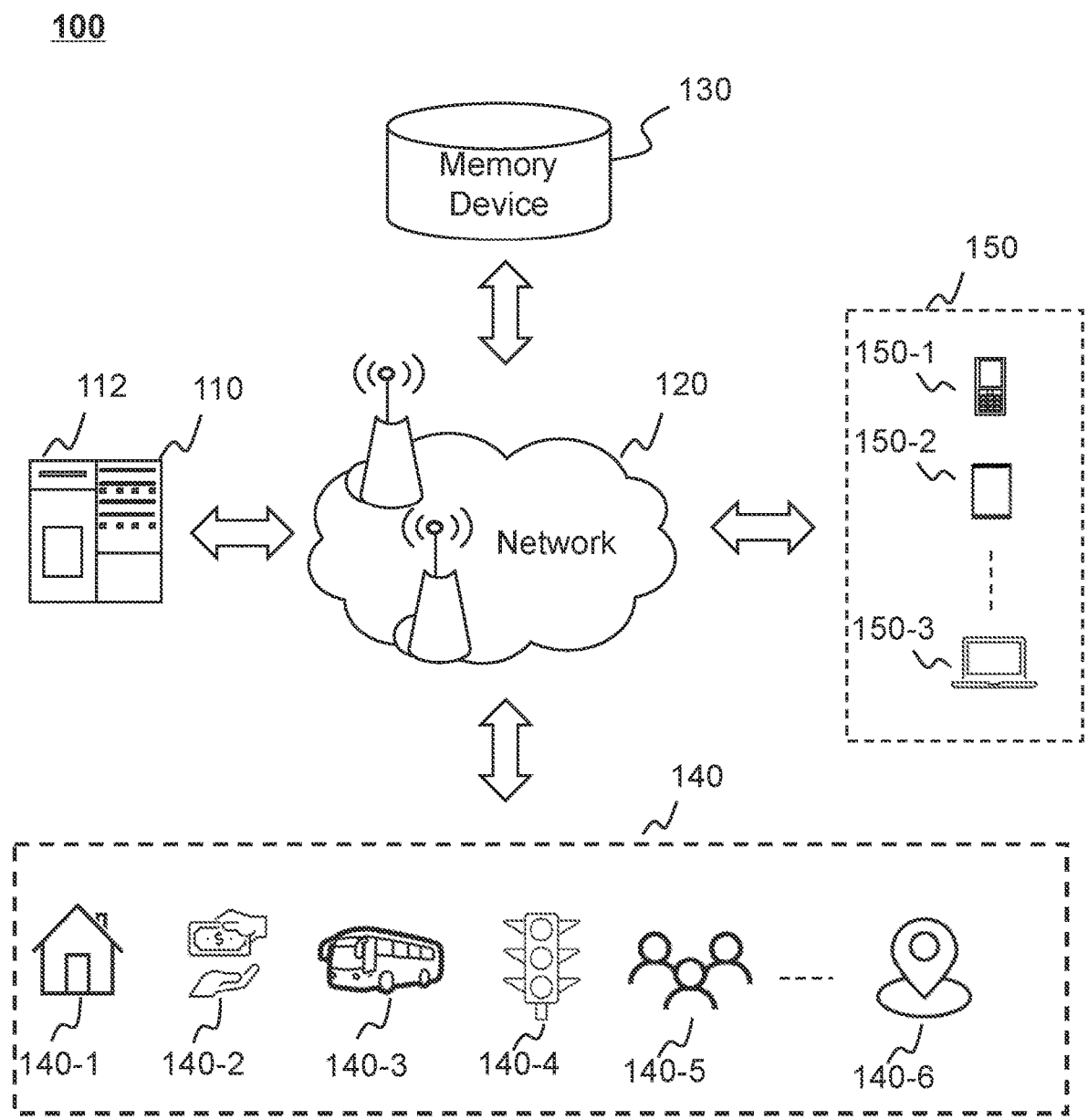
FIG. 1 is a schematic diagram illustrating an application scenario of a risk assessment system for affordable housing application in a smart city based on the Internet of Things according to some embodiments of this present disclosure.

In the following detailed description, numerous specific details are set forth by way of examples in order to provide a thorough understanding of the relevant disclosure. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless obviously obtained from the context or the context illustrates otherwise, the same numeral in the drawings refers to the same structure or operation.

It will be understood that the terms "system," "device," "unit," and/or "module" used herein are one method to distinguish different components, elements, parts, sections, or assemblies of different levels. However, the terms may be displaced by another expression if they achieve the same purpose.

The terminology used herein is for the purposes of describing particular examples and embodiments only and is not intended to be limiting. As used herein, the singular forms "a," "an," and "the" may be intended to include the plural forms as well, unless the context clearly indicates otherwise; the plural forms may be intended to include the singular forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

The flowcharts used in the present disclosure illustrate operations that systems implement according to some embodiments of the present disclosure. It is to be expressly understood the operations of the flowcharts may be implemented not in order. Conversely, the operations may be implemented in an inverted order, or simultaneously. Moreover, one or more other operations may be added to the flowcharts. One or more operations may be removed from the flowcharts.

FIG. 1 is a schematic diagram illustrating an application scenario of a risk assessment system for affordable housing application in a smart city based on the Internet of Things according to some embodiments of this present disclosure.

In some embodiments, the application scenario 100 of the risk assessment system for affordable housing application in the smart city based on the Internet of Things may include a server 110, a network 120, a storage device 130, an information system 140 and a terminal device 150. The server 110 may include a processing device 112.

In some embodiments, the components in the application scenario 100 may connect and/or communicate with each other via the network 120 (e.g., a wireless connection, a wired connection, or a combination thereof). For example, the processing device 110 may be connected to the storage device 130 through the network 120. As another example, the terminal device 140 may be connected to the processing device 110 and the storage device 130 through the network 120.

In some embodiments, the application scenario 100 may obtain a query result for a user's query request by implementing the methods and/or processes disclosed in this present disclosure. For example, the processing device may receive a user-initiated query request for the risk of affordable housing application based on the user platform; based on the service platform, generate a query instruction according to the query request and send it to the management platform; based on the management platform, according to the query instruction, obtain the query result, and upload the query result to the service platform; upload the query result based on the service platform and upload it to the user platform for feedback to the user.

The server 110 may be connected to the terminal device 150 through the network 120, and the server 110 may be connected to the storage device 130 through the network 120, the server 110 may be used to manage resources and process data and/or information from at least one component of the system or external data sources (e.g., a cloud data center). In some embodiments, a user-initiated query request for the risk of affordable housing application may be received through the server 110. The server 110 may obtain data on the storage device 130 or save the data to the storage device 130 during processing. In some embodiments, the server 110 may be a single server or server group. In some embodiments, the server 110 may be configured as a service platform. In some embodiments, the server 110 may be configured as a management platform; in some embodiments, the server 110 may be regional or remote. In some embodiments, the server 110 may be implemented on a cloud platform, or provided in a virtual fashion.

In some embodiments, server 110 may include a processing device 112. The processing device 112 may be used to process information and/or data related to the application scenario 100, for example, an affordable housing application, information about an applicant of an affordable housing application, assessment risk of an affordable housing application, or the like. In some embodiments, the processing device 112 may include one or more processing engines (e.g., single-chip processing engines or multi-chip processing engines). By way of example only, the processing device 112 may include a central processing unit (CPU). The processing device 112 may process data, information and/or processing results obtained from other devices or system components and execute program instructions based on such data, information and/or processing results to perform one or more functions described in this present disclosure. For example, the processing device 112 may be configured to perform platform maintenance and management tasks for the management platform.

The network 120 may connect various components of the application scenario 100 and/or connect the system and external resource parts. The network 120 enables communication between the various parts and other parts outside the system, facilitating the exchange of data and/or information. In some embodiments, the network 120 may be any one or more of a wired network or a wireless network. For example, the network 120 may include a cable network, a fiber optic network, or the like, or any combination thereof. The network connection between the various parts may be in one of the above-mentioned ways, and may also be in a variety of ways. In some embodiments, the network may be in point-to-point, shared, centralized, etc., various topologies or a combination of multiple topologies. In some embodiments, the network 120 may include one or more network access points. In some embodiments, related data of the storage device 130, the information system 140, the terminal device 150, etc., may be transmitted through the network 120.

The storage device 130 may be used to store data and/or instructions. In some embodiments, the storage device 130 may store data and/or instructions used by the server 110 to perform or achieve the exemplary methods described in the present disclosure. In some embodiments, the storage device 130 may be connected to network 120 to communicate with one or more components of application scenario 100 (e.g., server 110, terminal device 150, information system 140).

The information system 140 may refer to a system that provides relevant data and/or information used to the risk assessment for the affordable housing application. In some embodiments, the information system 140 may include a housing information system 140-1, a life consumption information system 140-2, a public transportation information system 140-3, a road traffic information system 140-4, a population information system 140-5, a location information Systems 140-6, etc. Various systems included in the information system 140 may be configured to communicate with the server 110 to enable the transfer of data.

The housing information system 140-1 may include information related to the life place. For example, the address where you live, the property rights of the house where you live, the time you live, etc.

The life consumption information system 140-2 may include information related to consumption behaviors in daily life. For example, the amount of consumption, the frequency of consumption, the place of consumption, etc. The life consumption information system 140-2 may also include loan information, for example, the amount of the loan, the number of times, or the like.

The public transportation information system 140-3 may include information related to public transportation. For example, the number of times public transportation taken, the public transportation taken, the time of public transportation, etc.

The road traffic information system 140-4 may include information related to traffic on the road. For example, the speed limit information of the road, the congestion situation of the road, the traffic flow of the road, etc.

The population information system 140-5 may include information related to population information. For example, people's marital status, people's kinship, etc.

The location information system 140-6 may include information related to location information. For example, people's real-time location, historical location, etc.

In some embodiments, the information system 140 may be a data source from the system or external source. In some embodiments, the information system 140 may send relevant data and/or information to the server 110 over the network 120. In some embodiments, the information system 140 may function as a sub-platform of the service platform and/or the management platform. For example, the housing information system 140-1, the population information system 140-5 and the location information system 140-6 may be used as the housing service sub-platform, the population information service sub-platform and the location sub-platform respectively in the service platform. As another example, the life consumption information system 140-2, the public transportation information system 140-3 and the road traffic information system 140-4 may be used as the life consumption management sub-platform, the public transportation management sub-platform and the road traffic management sub-platform respectively in the management platform.

The terminal device 150 may include one or more terminal devices or software. In some embodiments, the terminal device 150 may include a mobile phone 150-1, a tablet computer 150-2, a laptop computer 150-3, or the like. In some embodiments, the user of the terminal device 150 may be one or more users. The user may be the applicant of the affordable housing, the reviewer of the risk assessment of the affordable housing application, etc. In some embodiments, the user may view information and/or enter data and/or instructions through the terminal device 150. For example, the user may input a query instruction or the like to ensure the housing application risk through the terminal device 150. As another example, the user may view the assessment result of the risk of the affordable housing application through the terminal device 150. In some embodiments, the terminal device 150 may be used as a user platform to receive a risk query request for an affordable housing application input by the user.

It should be noted that application scenario 100 is provided for illustrative purposes only and is not intended to limit the scope of this present disclosure. Those ordinarily skilled in the art may make various modifications or changes based on the description of the present specification. For example, the application scenario may also include a database. As another example, the application scenario may be implemented on other devices to achieve similar or different functions. However, changes and modifications do not deviate from the scope of the present disclosure.

The system for the Internet of Things is an information processing system that includes part or all of a user platform, a service platform, and a management platform. The user platform is the leader of the entire operating system of the Internet of Things, which may be configured to obtain the demand of a user. The demand of the user is a foundation and premise of the formation of the operating system of the Internet of Things. The connection between each platform of the Internet of Things is to meet the demand of the user. The service platform is a bridge between the user platform and the management platform to realize the connection of the user platform and the management platform. The service platform may provide a user with input and output services. The management platform may realize the connection and collaboration between various functional platforms (such as the user platform and the service platform). The management platform brings together information about the Internet of Things operation system, which may provide the functions of perception management and control management for the operation system of Internet of Things.

The processing of information in the Internet of Things system may be divided into the processing flow of perception information and the processing flow of control information, and the control information may be information generated based on the perception information. The processing of the perceptual information is that the perceptual information is passed to the service platform by the management platform and eventually reaches the user platform. The control information is issued by the user platform and reaches the management platform through the service platform.

In some embodiments, when the Internet of Things system is applied to city management, it may be called the Internet of Things system of a smart city.

Figure 2:
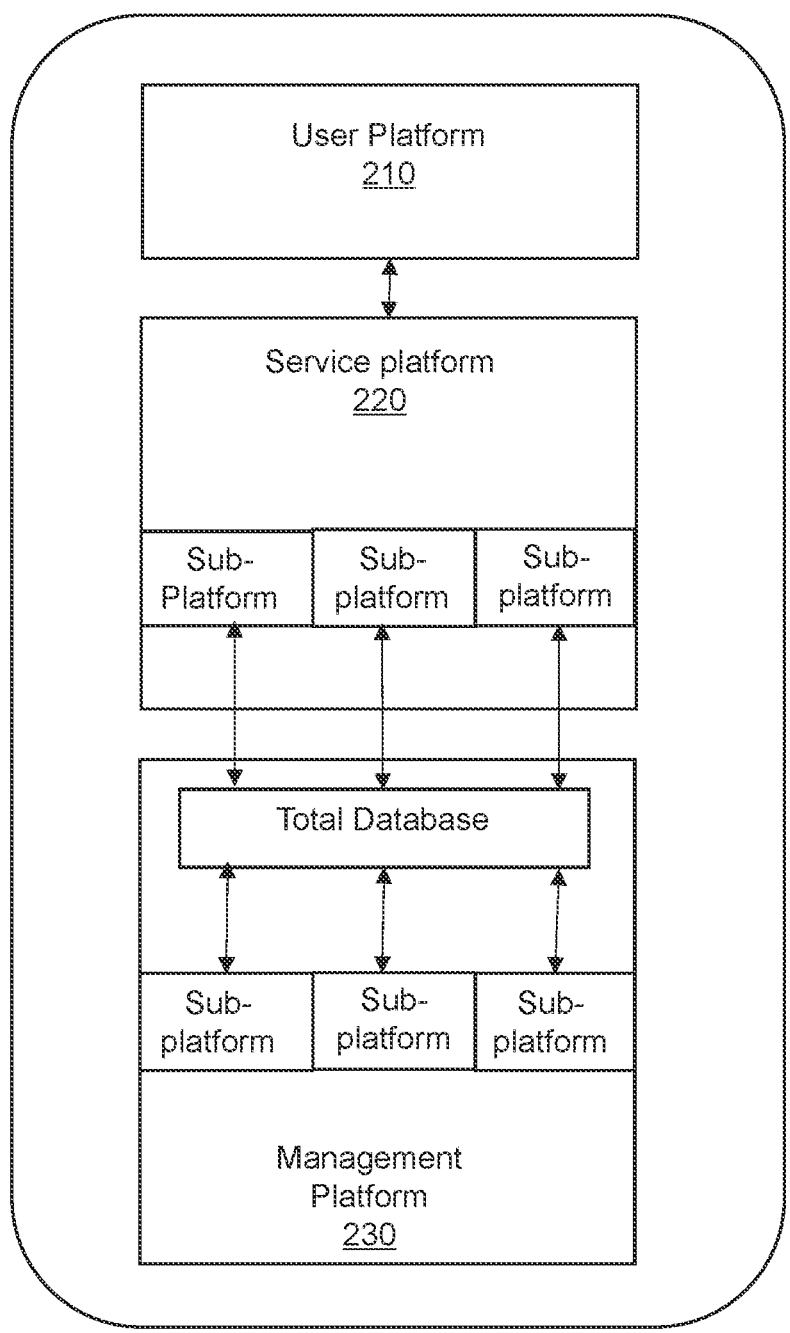
FIG. 2 is an exemplary schematic diagram illustrating a risk assessment system for affordable housing application in a smart city based on the Internet of Things according to some embodiments of the present disclosure.

FIG. 2 is an exemplary schematic diagram illustrating a risk assessment system for an affordable housing application in a smart city based on the Internet of Things according to some embodiments of the present disclosure. As shown in FIG. 2, the risk assessment system 200 for affordable housing application in the smart city based on the Internet of Things, hereinafter referred to as the system 200, includes a user platform 210, a service platform 220 and a management platform 230. In some embodiments, the system 200 may be part of or implemented by the server 110.

In some embodiments, the system 200 may be applied to a variety of scenarios for risk assessment of affordable housing application. In some embodiments, the system 200 may obtain a query instruction based on a query request for the risk of an affordable housing application initiated by a user, and obtain a query result according to the query instruction. In some embodiments, the system 200 may, based on the query request for the risk of the affordable housing application and the housing information, life consumption information, public transportation information, loan information, basic information and other related information of the applicant and its associated persons, determine the results of the risk assessment for the applicant's affordable housing application.

The various scenarios of risk assessment for affordable housing applications can include the assessment of the applicant's public transportation rides, the assessment of life consumption, and the risk prediction of affordable housing applications, etc. It should be noted that the above scenarios are only examples and do not limit the specific application scenarios of the system 200. Those skilled in the art can apply the system 200 to any other suitable scenarios based on the content disclosed in this embodiment.

In some embodiments, when the system 200 is applied to the assessment of the public transportation riding situation of the applicant, the management platform may obtain the public transportation riding information of the applicant, for example, based on the applicant's bus, subway card swiping records, etc., to determine the number and frequency of the applicant's monthly bus riding, subway riding and other means of transportation, and combine the road congestion to determine whether the applicant's life is frugal. As another example, the management platform may obtain the monthly travel information of the applicant taking high-speed rails, planes, etc., to determine whether the applicant frequently travels with high-consumption, so as to evaluate the risk of the applicant's affordable housing application.

In some embodiments, when the system 200 is applied to the assessment of the life consumption situation of the applicant, the management platform may obtain the life track information of the applicant, and determine the information of the places where the applicant often goes. For example, the number of times the applicant goes to high-consumption places and the stay duration in each month may be counted, so as to determine the high-consumption situation of the applicant, and then assess the risk of the applicant's application for affordable housing.

In some embodiments, the system 200, when applied to the risk prediction of an affordable housing application, the management platform may obtain relevant information about the applicant and his/her related persons, including basic information (such as age, occupation, company, income, etc.), housing information (such as real estate information under the name, rental information, etc.), life consumption information, public transportation information (such as the number of bus, subway rides, etc.), loan information (such as the number and amount of loans that have been settled/to be repaid), etc., based on the relevant information, an associated information graph is constructed, and the management platform may process the above associated information graph and obtain the risk assessment result of the applicant affordable housing application. The management platform uploads the assessment results to the service platform, and the service platform uploads the assessment results to the user platform for feedback to users.

The system 200 will be specifically described below by taking the application of the system 200 to an application risk prediction scenario as an example.

The user platform 210 may refer to a user-led platform, including a platform that captures user needs and feeds back information to users. In some embodiments, the user platform 210 generates a query request based on the affordable housing application input by the applicant through the user platform. In some embodiments, the user platform 210 is configured as an input terminal for obtaining the user's query instruction. In some embodiments, the user platform 210 is configured to display a terminal that may feed query results back to the user. In some embodiments, the user platform 210 may send the query instruction to the service platform 220. In some embodiments, the user platform 210 may receive the risk query result sent by the service platform 220.

The service platform 220 may refer to a platform that communicates user input and control information. It connects the user platform 210 and the management platform 230. In some embodiments, the service platform 220 may receive a query request from the user platform 210, and query the relevant information of the applicant and his/her related persons, such as basic information, housing information, or the like. In some embodiments, the service platform 220 may send the query request and relevant information to the management platform 230 for further data analysis and processing based on the management platform 230.

In some embodiments, the service platform 220 may receive the query result of the risk assessment from the management platform 230, and send the query result to the user platform 210 for feedback to the user. In some embodiments, the service platform 220 may adopt an independent arrangement, which refers to that the service platform 220 uses different sub-platforms for data storage, data processing and/or data transmission for data of different types or different data sources.

In some embodiments, the service platform 220 may set a population information service sub-platform, a housing service sub-platform and a positioning sub-platform, the above-mentioned sub-platforms may perform data storage, data processing and/or data transmission on the relevant information of the affordable housing applicants and their related persons based on the needs of the risk assessment for affordable housing application. For example, the population information service sub-platform may send information such as people's marital status and kinship to the management platform. As another example, the housing service sub-platform may send information such as address of residence, property rights of residence, and time period of residence to the management platform. As another example, the positioning sub-platform may send information such a real-time position of people, historical position of people, or the like to the management platform.

The management platform 230 may refer to an Internet of Things platform that coordinates the connection and cooperation between various functional platforms and provides perception management and control management. In some embodiments, the management platform 230 receives a query request for the risk of an affordable housing application issued by the service platform 220, and sends the risk assessment result to the service platform 220.

In some embodiments, the management platform 230 may employ a front-split arrangement. The front-split arrangement refers to that the management platform is provided with a total database and multiple sub-platforms, the multiple sub-platforms store and process corresponding data according to different data sources, each sub-platform further aggregates the processed data into the total database, and the management platform analyzes, processes and stores based on the aggregated data, and then transmits the data to the service platform through the total database. For example, the management platform 230 may obtain the age, marriage, kinship and other information of the applicant from the population information service sub-platform of the service platform 220 based on the needs of the risk assessment for affordable housing application, the residence information, real estate information, etc., of the applicant and his/her related persons may also be obtained from the housing service sub-platform of the service platform 220. In some embodiments, the multiple sub-platforms included in the management platform 230 may include a sub-platform for life consumption management, a sub-platform for public transportation management, and a sub-platform for road traffic management.

In some embodiments, in response to the query request, the management platform 230 is configured to obtain the relevant information of the applicant and his/her related persons through the management sub-platform corresponding to the management platform 230 and the service sub-platform corresponding to the service platform 220, determine the risk of the affordable housing application of the applicant. For example, the management platform 230 may, based on the user's query request for an affordable housing risk for the applicant, by using the sub-platform for life consumption management (also referred to as life consumption management sub-platform) and the sub-platform for public transportation management (also referred to as public transportation management sub-platform) corresponding to the management platform 230, and the sub-platform for population information service (also referred to as population information service sub-platform) corresponding to the service platform 220, process and aggregate the life consumption information and public transportation riding information of the applicant and his/her related persons into the total database of the management platform 230 respectively, the management platform 230 may process (e.g., construct an associated information graph) based on the aggregated information, obtain and store the risk of the affordable housing application, and upload the risk of the affordable housing application to the service platform 220 through the total database.

In order to simplify the description, in the above example, the life consumption management sub-platform and the public transportation management sub-platform corresponding to the management platform 230 respectively summarize the life consumption information and public transportation riding information of the user and his/her related persons into the total database of the management platform 230, the management platform 230 may perform processing based on the aggregated information, which may be described as "communication between the management platform and the management sub-platforms". The term "communication between the management platform and the management sub-platforms" in this present disclosure may refer to that the management platform sends data instructions to each management sub-platform, and summarizes the data obtained from each management sub-platform into the management platform's total database. Similarly, the term "communication between the management platform and the service platform" in this present disclosure may refer to that the management platform sends an instruction to obtain the relevant data to the service platform, processes and aggregates the data issued by the service platform and/or service sub-platforms into the total database of the management platform.

In some embodiments, the relevant information includes at least one of housing information, life consumption information, public transportation information, loan information, and basic information.

In some embodiments, the public transportation information includes public transportation riding situation when the road section is congested.

In some embodiments, the life consumption information includes life track information, and the management platform 230 is further configured to generate a life feature vector based on the life track information, wherein the life feature vector includes the number of visits to each type of place, the average stay time (duration) at each type of place, the proportion of high-consumption places.

In some embodiments, the management platform 230 is further configured to input the relevant information of the applicant and his/her related persons into a risk prediction model to determine the risk of an affordable housing application, and the risk prediction model is a machine learning model.

In some embodiments, the risk prediction model includes a graph neural network model, and the management platform 230 is further configured to input the associated information graph into the graph neural network model, and determine the affordable housing application risk of the applicant based on the output of the node corresponding to the applicant. The associated information graph is obtained based on the relevant information of the applicant and his/her related persons.

In some embodiments, the node of the associated information graph include object nodes and feature nodes, the object nodes correspond to the applicant and his/her related persons, and the feature nodes correspond to the relevant information of the applicant and his/her related persons; the edge of the associated information graph include the first type edge and the second type edge, and the first type edge is used to connect the object nodes; the feature of the first type edge is the life similarity between the connected object nodes; the second type edge is used to connect the object nodes and the feature nodes corresponding to the object node; the feature of the second type edge is the eigenvalue of the connected feature nodes.

In some embodiments, the feature node includes at least one of an age node, an occupation node, a public transportation node, a loan node, and a life consumption node; the age node includes nodes of a plurality of preset age groups, and the occupation node includes nodes of multiple preset occupations.

In some embodiments, an input of the risk prediction model further includes a confidence level, the confidence level is related to the number of nodes and edges included in the associated information graph.

Figure 4:
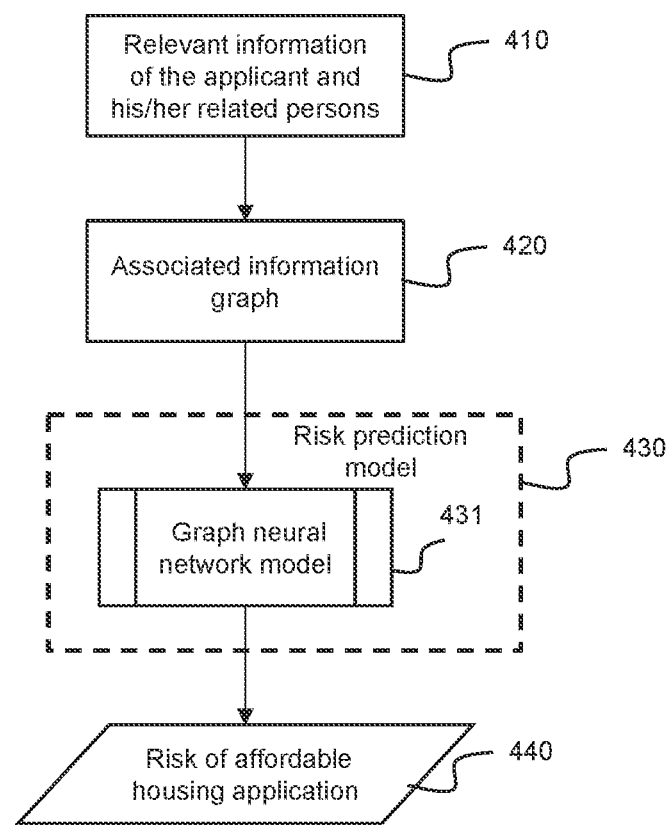
FIG. 4 is an exemplary schematic diagram of determining the risk of the affordable housing application of an applicant according to some embodiments of the present disclosure.
Figure 5:
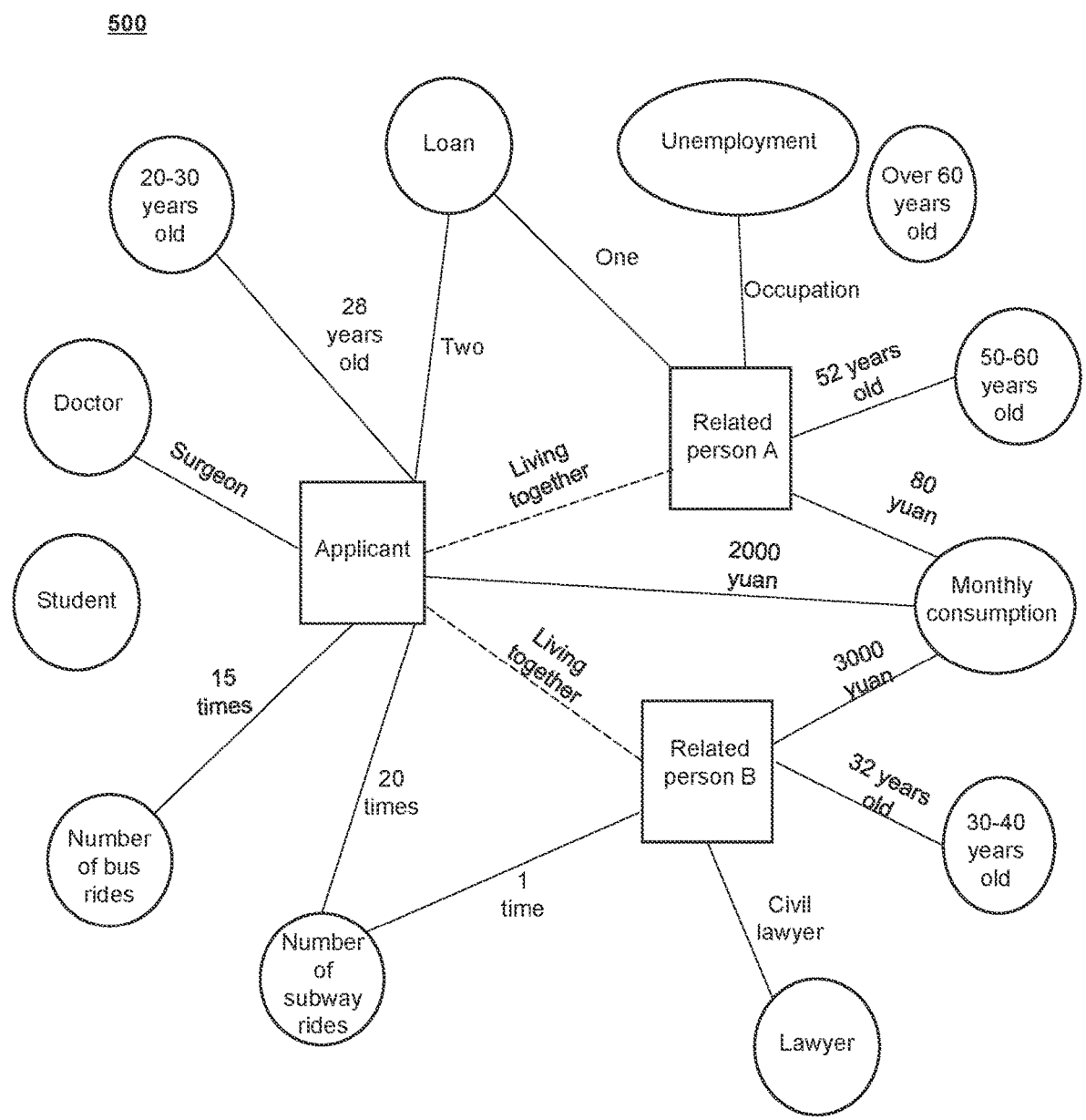
FIG. 5 is an exemplary schematic diagram illustrating an associated information graph according to some embodiments of the present disclosure.

For the specific description of the management platform 230, please refer to FIGS. 3-5 and its related descriptions.

It should be noted that the above description of the system and its parts are only for the convenience of description, and does not limit the description to the scope of the illustrated embodiments. It may be understood that for those skilled in the art, after understanding the principle of the system, it is possible to arbitrarily combine the various parts, or form a subsystem to connect with other parts without departing from the principle. For example, the management platform of city vaccines and the vaccine service platform may be integrated into one component. As another example, each part may share one storage device, and each part may also have its own storage device. Those variations and modifications may be within the scope of the protection of one or more embodiments of the disclosure.

FIG. 3 is an exemplary flowchart illustrating a risk assessment method for an affordable housing application in a smart city based on the Internet of Things according to some embodiments of the present disclosure. As shown in FIG. 3, the process 300 includes the following steps. In some embodiments, process 300 may be performed by the management platform 230.

Step 310, the management platform obtains a query request for the risk of the affordable housing application from the service platform, and the query request is generated by the user platform based on the affordable housing application input by an applicant through the user platform.

The applicant may refer to a person who applies for the affordable housing. For example, low-income households and people, whose annual income is lower than the prescribed income standard, apply to government agencies for affordable housing because they cannot guarantee basic housing needs. These people may be called applicants.

The affordable housing application may refer to the applicant's demand or instruction for the affordable housing application. In some embodiments, the applicant may submit an affordable housing application through the user platform 210. For example, the applicant may input on the user platform 210, for example, fill in the information for affordable housing application, click the "Apply for affordable housing" option, etc., to apply for affordable housing.

The risk of affordable housing application may refer to the possibility that the applicant does not meet the requirements for affordable housing application. For example, if the applicant already owns a house with good conditions, he/she does not meet the requirements for the affordable housing application. The risk of affordable housing application may be expressed in words, numbers and other ways. For example, the risk of affordable housing application may be a numerical value from 0-100. The higher the value is, the greater the risk is, and the lower the probability that the applicant's affordable housing application will be approved. For another example, the risk of affordable housing application may be a preset level, such as level 1, level 2, level 3, level 4, etc. The higher the level is, the greater the risk is, and the lower the probability of the applicant's affordable housing application is approved.

The query request for the risk of affordable housing application may refer to an instruction to query about the risk of affordable housing application. The query request for the risk of an affordable housing application may be generated based on an affordable housing application input by the applicant through the user platform 210. For example, after the applicant completes the affordable housing application through the user platform 210, the user platform 210 may generate a query request for the risk of the affordable housing application.

In some embodiments, the management platform may communicate with the service platform, and obtain a query request for the risk of the affordable housing application from the service platform. For example, after the applicant sends a query request for the risk of an affordable housing application through the user platform to the service platform, the management platform may obtain the query request from the service platform.

Step 320, in response to the query request, the management platform obtains the relevant information of the applicant and his/her related persons through the management sub-platform corresponding to the management platform and the service sub-platform corresponding to the service platform, and determines the risk of the affordable housing application of the applicant.

The related persons may refer to those who have a relationship with the applicant. For example, family members, colleagues, friends, etc. of the applicant. In some embodiments, the relevant information of the related persons may be obtained by the management platform through each service sub-platform and/or management sub-platform. For example, the management platform may obtain the related persons from the population information service sub-platform, and then obtain the amount of consumption of the related person, the number of times of consumption and other information from the life consumption management sub-platform based on the identification of the related persons (such as ID number, ID, etc.). For more information about the population information service sub-platform and the life consumption management sub-platform, please refer to FIG. 2 and its related descriptions.

In some embodiments, the related persons may refer to those who live with the applicant. For example, parents, spouses, siblings, etc. who live with the applicant within a predetermined range. The predetermined range may refer to a predetermined geographic range. For example, the same room, building, community, etc. The predetermined range may be adjusted according to actual needs.

The relevant information may refer to the information related to the applicant and his/her related persons. For example, clothing, food, housing, and transportation information. In some embodiments, the relevant information of the applicant and his/her related persons include at least one of housing information, life consumption information, public transportation information, loan information, and basic information of the applicant and his/her related persons.

In some embodiments, in response to a query request of an applicant's affordable housing application risk, the management platform may obtain the relevant information of the applicant and his/her related persons through the management sub-platform corresponding to the management platform and the service sub-platform corresponding to the service platform. For example, the management platform may communicate with various service sub-platforms and/or management sub-platforms to obtain relevant information. For example, the management platform communicates with the positioning sub-platform to obtain the real-time location and historical location of the applicant and his/her related persons. As another example, the management platform communicates with the life consumption management sub-platform to obtain loan information of the applicant and his/her related persons.

In some embodiments, the management platform may obtain the housing information of the applicant through the housing service sub-platform. For example, the management platform may communicate with the housing service sub-platform to obtain housing information of the applicant. The housing information of the applicant may refer to information related to the residence of the applicant. The housing information of the applicant may include at least one of the historical rental situation, the real estate situation under the name, and the historical affordable housing application information.

In some embodiments, the management platform may obtain the housing information of the related persons of the applicant. For example, the management platform may communicate with the housing service sub-platform based on the related persons of the applicant obtained from the population information service sub-platform of the service platform to obtain the housing information of the related persons of the applicant.

In some embodiments, the management platform may determine whether the applicant has real estate transfer based on the housing information of the applicant and the housing information of the related persons of the applicant.

For example, the management platform may record the change of the owner of the real estate property. If the owner of the property is changed from the applicant to the parent of the applicant, the management platform may consider that there is a real estate transfer.

The public transportation information may refer to information related to taking public transportation. For example, the number, time, etc., of public transportation taken each month. In some embodiments, the public transportation information includes public transportation riding situation when the road section is congested.

The public transportation riding situation may refer to the record of the applicant taking public transportation. For example, whether to take the bus today. As another example, the number of bus rides per month. In some embodiments, the management platform may obtain the public transportation riding situation of the applicant through the public transportation management sub-platform. For example, the management platform communicates with the public transportation management sub-platform to obtain the swiping records of the public transportation of the applicant, such as the boarding and alighting records of the applicant. The management platform may also obtain the number and frequency of the applicant to take the public transportation through statistics.

In some embodiments, the management platform may determine the public transportation riding situation of the applicant when the road section is congested according to the public transportation riding situation of the applicant. The management platform may obtain the road congestion situation in various ways. For example, the management platform may communicate with the road traffic management sub-platform to obtain the road congestion situation in each time period. In some embodiments, the management platform may determine the congestion value based on road congestion situations. The congestion value may be represented by various methods such as text, numbers. Exemplarily, the congestion value may be represented by a value of 0 or 1, wherein the congestion value is 1, indicating that a traffic jam occurs; the congestion value is 0, indicating that the road is unobstructed.

The public transportation riding information may also include the long-distance travel information of the applicant within a period of time (e.g., a week, a month, etc.), such as the travel information of the applicant by train, long-distance bus, etc., as well as high-consumption travel information. The high-consumption travel may refer to a travel in which the amount of consumption on the travel exceeds a first preset threshold. The first preset threshold may be set based on experience. The high-consumption travel information may include the number and amount of high-consumption travel, or the like. If the amount of travel consumption is higher than the first preset threshold, the management platform may consider the travel to be a high-consumption travel, and determine that the consumption level of the applicant is relatively high.

Using the public transportation information of the applicant to determine the risk of an affordable housing application can improve the accuracy of the determined result. It is understandable that if the applicant chooses to take the bus instead of driving or taking a taxi because the road is blocked, it does not mean that the applicant's life is relatively poor. If the corresponding section of the bus or subway is not blocked by the applicant, and the applicant frequently takes the bus and subway, it may indicate that the applicant's life situation is at least frugal to a certain extent, and the management platform may reduce the risk of affordable housing application.

In some embodiments, the life consumption information includes life track information.

The life track may refer to what the applicant does and/or which places the applicant goes in their daily life. For example, at a certain period of time, the applicant travels from A community to B office building. The life track information may refer to information related to the life track of the applicant. For example, the time and place of life track. The life track information may be obtained by the management platform through the positioning sub-platform. The life track may be represented by a sequence consisting of information on places where the applicant has visited at multiple time points. For example, (08:00, A community), (09:00, B office building), (12:00, C Hotel), (21:00, D bar).

It can be understood that there are different categories of places, for example, non-consumption places (such as parks, communities, office buildings, etc.), consumption places (such as bookstores, stationery stores, restaurants, bars, jewelry stores, etc.). The consumption places may include low consumption places and high-consumption places. The high-consumption place may refer to a consumption place with a minimum consumption level higher than a second preset threshold. The low consumption place may refer to a consumption place with a minimum consumption level lower than a third preset threshold. The second preset threshold and the third preset threshold may be determined based on the average income level, price level, etc. of the city or region where the applicant is located. Exemplarily, the high-consumption place may include luxury hotels, luxury jewelry stores, auto dealerships, or the like. The low-consumption place may include bookstores and stationery stores.

In some embodiments, the management platform may judge the consumption situation of the applicant according to the life track information of the applicant. For example, based on the life track information, the management platform counts the places where the applicant often goes and the length of stay. Exemplarily, the management platform may count the total number of times of entering and leaving all places in the life track information of the applicant within a certain period of time, as well as the times of entering and leaving high-consumption places; then, the ratio of the number of times of entering and leaving high-consumption places to the total number of times of entering and leaving all places is obtained; when the ratio is greater than a fourth preset threshold, the management platform may determine that the high-consumption places of the applicant account for a relatively high proportion, and at the same time determine that the consumption level of the applicant is relatively high. The fourth preset threshold may be set according to experience.

In some embodiments, the management platform may generate a life feature vector based on the life track information. The life feature vector may refer to a vector representation of life track information. The life feature vector may include at least one of the number of visits to each type of place, the average stay time at each type of place, and the proportion of high-consumption places. It can be understood that the management platform may classify places into various types according to functions, consumption amount and other aspects. For example, accommodation venues, entertainment venues, catering venues, etc. As another example, high-consumption places, low consumption places, etc. Each type may refer to one of many types of places.

Exemplarily, the life feature vector may be represented as (a, b, c), where an element represents the type of place (for example, the value of a is 1 to represent a park; 2 represent a community; 3 represents an office building; 4 represents a hotel; 5 represents a bar, etc.), the b element represents the number of visits, and the c element represents the average stay time (for example, 30 represents an average stay of 30 minutes). For example, the life feature vector is (5, 5, 20), representing that the applicant has been to a bar 5 times, the average stay time is 20 minutes. In yet another example, the life feature may represent the situation of going to a consumption place, its vector is represented as (b, c, d), where b represents the number of consumption places, c represents the stay time in the consumption places, and d represents the proportion of high-consumption places (for example, a value of 0.5 means that the proportion is 50%), for example, the life feature vector is (8, 30, 0.5), which means that the applicant has been to the consumption place 8 times and stayed for an average of 30 minutes each time, among which the high-consumption place accounts for 50%.

In some embodiments, the life consumption information may further include a consumption situation of high-consumption places.

The consumption situation of high-consumption places may refer to information related to consumption in high-consumption places. For example, the consumption situation of high-consumption places may include the consumption times of the applicant in high-consumption places and the proportion of the consumption times of all places.

In some embodiments, the management platform may obtain the consumption situation of high-consumption places through the sub-platform of life consumption management. For example, the management platform may communicate with the life consumption management sub-platform to obtain the consumption records of the applicant in various high-consumption places.

Using the consumption situation of high-consumption places to determine the risk of affordable housing application can avoid or reduce the occurrence of obtaining affordable housing through deception. It is understandable that if the applicant's consumption in high-consumption places includes multiple consumption records in high-consumption places, the risk of affordable housing application will increase.

In some embodiments, the management platform may obtain the stay time of the applicant in the high-consumption places through the positioning sub-platform. The stay time may be used to assist in judging whether the applicant has consumed in high-consumption places. It is understandable that if the applicant stays in the high-consumption place for a short time, such as 1 minute, 20 minutes, etc., he/she may just pass through the high-consumption place, or find friends in the high-consumption place. If the applicant stays in the high-consumption place for a long time, such as 1 hour, 3 hours, etc., it is possible that the applicant has made consumption in the high-consumption place.

In some embodiments, the management platform may process the relevant information of the applicant and his/her related persons to determine the risk of the affordable housing application of the applicant.

In some embodiments, the management platform may conduct modeling or use various data analysis algorithms, such as regression analysis, discriminant analysis, etc., to analyze and process the relevant information of the applicant and his/her related persons, so as to determine the applicant's affordable housing application risk.

In some embodiments, the management platform may determine the risk of the affordable housing application of the applicant based on the risk prediction model. For more information about the risk prediction model, please refer to FIG. 4 and its related descriptions, which will not be repeated here.

Step 330, the management platform sends the risk of the affordable housing application to the service platform.

In some embodiments, the management platform may communicate with the service platform to send the risk of the affordable housing application to the service platform. After the management platform sends the risk of the affordable housing application to the service platform, the risk of the affordable housing application may be sent by the service platform to the user platform for the user to view.

Some embodiments of this present disclosure assess the risk of the affordable housing application of the applicant based on various relevant information about the applicant and his/her related persons of the affordable housing application obtained from various platforms, thereby improving the accuracy of the determined risk of the affordable housing application.

FIG. 4 is an exemplary schematic diagram of determining the risk of the affordable housing application of an applicant according to some embodiments of the present disclosure.

In some embodiments, the management platform may input the relevant information of the applicant and his/her related persons into the risk prediction model to determine the risk of the affordable housing application.

The risk prediction model is a trained machine learning model. The risk prediction model may include other models. For example, a recurrent neural network model, a convolutional neural network or other custom model structure, or the like, or any combination thereof.

The risk prediction model may output the risk of the affordable housing application based on the input as the relevant information of the applicant and his/her related persons.

In some embodiments, the management platform may train a risk prediction model based on multiple training samples and labels.

The training samples include information about historical applicants and their related persons. The labels of the training samples may be the corresponding risks of the affordable housing application of applicants, and the labels of the training samples may be manually labeled.

During the training process, the management platform may establish a loss function based on the labels of the training samples and the output of the risk prediction model, and update the parameters of the model. And based on the loss function, the parameters of the risk prediction model are iteratively updated until the preset condition is satisfied and the training is completed, and the trained prediction model is obtained. The preset condition may be that the loss function is smaller than the threshold, converges, or the training period reaches the threshold.

In some embodiments, the risk prediction model may comprise a graph neural network model. In some embodiments, the management platform may input the associated information graph into the graph neural network model, and determine the risk of the affordable housing application of the applicant based on the output of the node corresponding to the applicant. As shown in FIG. 4, the risk prediction model 430 may include a graph neural network model 431, the management platform generates an associated information graph 420 based on the relevant information 410 of the applicant and his/her related persons, inputs the associated information graph 420 into the graph neural network model 431, processes the associated information graph 420 through the graph neural network model 431, and determines the affordable housing application risk 440 of the applicant.

In some embodiments, the graph neural network model may be obtained through training. The training samples are historical associated information graphs, and the labels of the training samples may be the risk of the corresponding applicant's affordable housing application. The labels of the training samples may be labeled manually.

When training the initial graph neural network model, the management platform builds a loss function based on the labels of the training samples and the output of the graph neural network model, and iteratively updates the parameters of the graph neural network model based on the loss function until the preset condition is met and the training is completed, thereby obtaining the trained graph neural network model. The preset condition may be that the loss function is less than the threshold, convergence, or the training cycle reaching a threshold.

For the specific description about associated information graph, please refer to FIG. 5 and its related descriptions.

In some embodiments, the input to the risk prediction model further includes a confidence level, the confidence level being related to the number of nodes and edges included in the associated information graph. For more information about the nodes and edges of the associated information graph, please refer to FIG. 5 and its related descriptions, which will not be repeated here.

The confidence level may refer to a quantity used to assess the level of confidence of an associated information graph. It can be represented in various ways such as numbers and/or words. Exemplarily, the confidence level may be expressed with numbers, and the larger the numerical value is, the higher the confidence level is. The confidence level may be measured by the information contained in the associated information graph, the more information the associated information graph contains, the higher the confidence level is. It is understandable that the more nodes and edges in the associated information graph are, the more relevant information is, the more adequate the risk assessment of the affordable housing for the applicant is, and the more accurate the result is.

In some embodiments, the management platform may determine the confidence level through a preset table based on the number of nodes and edges included in the associated information graph. For example, when the number of nodes and edges included in the association information graph is 70, the confidence level may be determined to be 50% by checking the preset table. The preset table may be preset based on experience.

In some embodiments, the confidence level may be used as a feature node of the application object node in the associated information graph. For more information about the feature node, please refer to FIG. 5 and its related descriptions. Other nodes and edges in the associated information graph may have weights, and the weights may be preset when building the associated information graph.

In some embodiments, the management platform may obtain the number of nodes and edges included in the associated information graph in a statistical manner.

In some embodiments, the statistics may be performed by weighted summation, and the number of nodes and edges may be determined based on the hopping relationship between other nodes and edges and the applicant node.

The weighted summation may refer to the weighted statistics based on the weights of the nodes and edges and the number of hops of the nodes and edges with the target object when counting the number of nodes and edges.

The hopping relationship may refer to the distance relationship between a node or an edge that is directly and indirectly connected to another node and the node. The hopping relationship may be represented by hop count. The hop count may refer to the minimum number of nodes or edges that need to be traveled from a node to nodes or edges that are directly and indirectly connected to that node. For example, in the associated information graph A-B-C, node A is directly connected to node B through edge Aft and node B is connected to node C through edge BC. Node B and edge AB are the first hopping relationship of node A, node C and edge BC are the second hopping relationship of node A, the number of hops from node A to node C is 2, and the number of hops from node A to edge BC is 2.

In some embodiments, when the management platform counts the number of nodes and edges included in the associated information graph, the number of nodes and edges may be determined based on the weights of the nodes and edges. For example, the management platform may determine an edge with a weight of 50% as 0.5 edge.

In some embodiments, the management platform may perform weighted statistics based on the weights of nodes and edges, and hops of the nodes and edges to the target node.

In some embodiments, the farther the node/edge is from the applicant node, the larger the number of hops is, and the smaller the weight is, when participating in the calculation. For example, node A with a weight of 100% has a hop count of 1 to the applicant node. When participating in the calculation, the weight of node A may be 100%. As another example, for a node B with a weight of 100%, the number of hops to the applicant node is 2. When participating in the calculation, the weight of the node B may be 50%. The management platform may preset the weights of different hopping relationships based on the preset weight decay strategy (such as the successive halving strategy). For example, a node/edge with 1 hop count has a weight of 100%, a node/edge with 2 hop counts has a weight of 50%, and a node/edge with 3 hop counts has a weight of 25%.

In some embodiments, the management platform may perform weighted statistics based on the weights of nodes and edges and the number of hops with the target node, determine the number of nodes and edges, and then determine the confidence level through a preset table. Still taking the above example as an example, the management platform performs weighted statistics on node A and node B, and determines that the number of nodes and edges is 1.5 nodes in total. By querying the preset table, the confidence level is determined to be 1%.

Inputting the confidence level into the risk prediction model may be used to assist in judging whether the risk of affordable housing application output by the risk prediction model is credible, so as to avoid blindly trusting the output of the model and improve the accuracy of the determined risk of the affordable housing application.

In some embodiments of this present disclosure, by using a risk prediction model to determine the risk of an affordable housing application, the speed and accuracy of determining the risk for an affordable housing application can be improved, and the input of human and financial resources can also be reduced.

FIG. 5 is an exemplary schematic diagram illustrating an associated information graph according to some embodiments of the present disclosure.

The associated information graph may refer to a graph constructed based on the relevant information of the applicant and his/her related persons. It may represent the relationship and/or the degree of correlation between the existence of the related persons and/or various information and the applicant. The associated information graph includes multiple nodes and multiple edges. The nodes of the associated information graph are connected by edges, representing the relationship between the nodes. In some embodiments, the management platform may construct an associated information graph in various feasible ways based on the relevant information of the applicant and his/her related persons obtained by the management sub-platform corresponding to the management platform and the service sub-platform corresponding to the service platform.

In some embodiments, the nodes of the associated information graph include object nodes and feature nodes.

The object nodes correspond to the applicant and his/her related persons. As shown in FIG. 5, the object nodes in the associated information graph 500 are the applicant node, the affiliate A node, and the affiliate B node, respectively. The applicant node may represent the person submitting the affordable housing application, and the affiliate A node and the affiliate B node may represent the related persons of the applicant. If the applicant may be connected with the affiliate A and the affiliate B through an edge, please refer to the following for the specific description of the edge.

The object nodes may have features. The features of the object nodes may indicate that object nodes have features different from other object nodes. For example, the features of the object nodes may include a confidence level.

The feature nodes correspond to various relevant information of the applicant and his/her related persons, such as age, occupation, public transportation information, loan information, and life consumption information. Each feature node may have different features. In some embodiments, the management platform may, according to the category to which the relevant information belongs, determine the category as the feature node and the feature of the feature node. For example, the management platform may determine age as a feature node according to the category to which the age of 25 belongs as age, and determine the feature of the feature node as age. The category to which the relevant information belongs may be labeled by the management platform.

In some embodiments, the feature node includes at least one of an age node, an occupation node, a public transportation node, a loan node, and a life consumption node.

In some embodiments, the age node includes nodes of a plurality of preset age groups. As shown in FIG. 5, the age node of the associated information graph 500 includes a 20-30-year-old node, a 30-40-year-old node, a 50-60-year-old node, and a node over 60 years old.

In some embodiments, the occupation node includes multiple preset occupation nodes. As shown in FIG. 5, the occupation node in the associated information graph 500 includes a doctor node, a student node, an unemployment node, and a lawyer node.

In some embodiments, the public transportation node corresponds to the public transportation riding situation when the road section is congested. As shown in FIG. 5, the public transportation node of the associated information graph 500 includes a bus ride times node and a subway ride times node. The management platform may determine the number of bus rides and subway rides in FIG. 3 as the node of the number of bus rides and the node of the number of subway rides.

In some embodiments, the life consumption node corresponds to a high-consumption place consumption situation. As shown in FIG. 5, the life consumption node of the associated information graph 500 includes the monthly consumption amount nodes.

The edge of the associated information graph is used to connect object nodes and feature nodes or object nodes and object nodes, and edge-based features may represent the relationship between nodes and nodes. The edge includes the first type edge and the second type edge.

The first-type edge may refer to an edge used to connect two object nodes. The feature of the first type edge is the life similarity between the objects represented by the two connected object nodes.

The life similarity may refer to the degree of similarity of the living habits of the applicant and his/her related persons. For example, consumption habits, travel habits. In some embodiments, the management platform may calculate the similarity between the above two vectors in various feasible ways based on the life feature vector of the applicant and the life feature vector of each of the related persons, and then determine the life similarity. For example, the management platform may use the method described in FIG. 4 to determine the life feature vector of the applicant and the life feature vector of each of the related persons, and by calculating the Euclidean distance, determine the similarity between the above two vectors, and determine the similarity between the above two vectors as the life similarity. In some embodiments, the life similarity is used as a feature value of the first type edge.

The second type edge may refer to the edge used to connect an object node and a feature node. If the object node has the feature of the feature node, the object node and the feature node may be connected to form the second type edge, the second type edge may have a feature value, and the feature value of the second type edge may be determined based on the relevant information of the applicant and his/her related persons.

As shown in FIG. 5, in the associated information graph 500, for the applicant node and the 20-30-year-old node, the age of the applicant is 28 years old, which meets the preset age range of 20-30 years old, then the applicant node is connected with the 20-30-year-old node to form the second type edge, and the feature value of the edge is 28 years old; as another example, for a loan node, the applicant has 2 loan information, the related person A has 1 loan information, and the related person B has no loan information, then the applicant node and the loan node are connected to form an edge, and the feature value of the edge is 2 loans; the related person A node is connected with the loan node to form an edge, and the feature value of the edge is 1; the related person B has no loan information and does not need to be connected to the loan node, that is, there is no such edge.

In order to further improve the accuracy of the determined risk of the affordable housing application, when building the associated information graph, more information about the applicant and his/her related persons may be obtained based on the method described in FIG. 3 above, for example, the income information and capital transaction information of the applicant and his/her related persons, and may be used as a feature node, which is connected with the object node through the second type edge. The feature value of the second type edge may be determined based on the obtained information about the applicant and his/her related persons.

In some embodiments, the confidence level may be used as a feature of the applicant node. For example, the confidence level obtained by the above method is 1%, which may be used as the feature of the applicant node.

By constructing an associated information graph in some embodiments of this present disclosure, it is possible to better represent the applicant and his/her related persons, as well as various relationships existing between the relevant information of the applicant and his/her related persons, which is helpful for more accurate risk assessment for the applicant's affordable housing application.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A risk assessment method for an affordable housing application in a smart city based on Internet of Things, which is realized by a risk assessment system for an affordable housing application in a smart city based on Internet of Things, the risk assessment system comprising a user platform, a service platform and a management platform, the risk assessment method being executed by the management platform, and the method comprising:

obtaining a query request for a risk of the affordable housing application from the service platform, wherein the query request is generated by the user platform based on an input of the affordable housing application by an applicant through the user platform;

in response to the query request, through a management sub-platform corresponding to the management platform and a service sub-platform corresponding to the service platform, obtaining relevant information of the applicant and related persons thereof, and determining the risk of the affordable housing application of the applicant; the management platform adopting different management sub-platforms for data storage, data processing and/or data transmission; wherein the different management sub-platforms correspond to different information sources; and sending the risk of the affordable housing application to the service platform; wherein the obtaining relevant information of the applicant and the related persons thereof, and determining the risk of the affordable housing application of the applicant includes:

inputting an associated information graph and a confidence level into a graph neural network model, and determining the risk of the affordable housing application of the applicant based on an output of a node corresponding to the applicant; wherein the associated information graph is obtained based on the relevant information of the applicant and the related persons thereof; wherein the associated information graph includes multiple nodes and multiple edges, the multiple nodes include object nodes and feature nodes, the object nodes correspond to the applicant and the related persons thereof, the feature nodes correspond to the relevant information of the applicant and the related persons thereof; each of the multiple edges includes a first-type edge for connecting two of the object nodes and a second-type edge for connecting the object nodes to the feature nodes, a feature of the first-type edge is a life similarity between objects represented by the two connected object nodes, and a feature of the second-type edge is determined based on the relevant information of the applicant and the related persons thereof;

the confidence level is determined based on a number of nodes and edges included in the associated information graph, the number of nodes and edges included in the associated information graph is determined based on a hopping relationship between a node corresponding to the applicant and other nodes and edges in the associated information graph that are directly and non-directly connected to the node corresponding to the applicant.

2. The risk assessment method of claim 1, wherein the related information includes at least one of housing information, life consumption information, public transportation information, loan information, and basic information; and the basic information includes at least one of ID number, name, age and occupation.

3. The risk assessment method of claim 2, wherein the public transportation information includes: a public transportation riding situation when a road section is congested.

4. The risk assessment method of claim 2, wherein the life consumption information includes life track information, and the method further comprises generating a life feature vector based on the life track information, the life feature vector being used to determine the life similarity, wherein the life feature vector includes at least one of a number of times to go to each type of place, average stay time at each type of place, and a proportion of high-consumption places.

5. The risk assessment method of claim 2, wherein the life consumption information further comprises consumption situations of high consumption places.

6. The risk assessment method of claim 1, wherein each of the feature nodes comprises: at least one of an age node, an occupation node, a public transportation node, a loan node, and a life consumption node; and the age node includes nodes of a plurality of preset age groups, and the occupation node includes nodes of a plurality of preset occupations.

7. A risk assessment system for an affordable housing application in a smart city based on Internet of Things, comprising a user platform, a service platform, and a management platform;

the service platform is used to obtain a query request for a risk of the affordable housing application from the service platform, wherein the query request is generated by the user platform based on an input of the affordable housing application by an applicant through the user platform;

the management platform is used to, in response to the query request, through a management sub-platform corresponding to the management platform and a service sub-platform corresponding to the service platform, obtain relevant information of the applicant and his/her related persons thereof, and determine the risk of the affordable housing application of the applicant; the management platform adopting different management sub-platforms for data storage, data processing and/or data transmission; wherein the different management sub-platforms correspond to different information sources; and send the risk of the affordable housing application to the service platform; wherein the obtaining relevant information of the applicant and the related persons thereof, and determining the risk of the affordable housing application of the applicant includes:

inputting an associated information graph and a confidence level into a graph neural network model, and determining the risk of the affordable housing application of the applicant based on an output of a node corresponding to the applicant; wherein the associated information graph is obtained based on the relevant information of the applicant and the related persons thereof; wherein the associated information graph includes multiple nodes and multiple edges, the multiple nodes include object nodes and feature nodes, the object nodes correspond to the applicant and the related persons thereof, the feature nodes correspond to the relevant information of the applicant and the related persons thereof; each of the multiple edges includes a first-type edge for connecting two of the object nodes, and a second-type edge for connecting the object nodes to the feature nodes, a feature of the first-type edge is a life similarity between objects represented by the two connected object nodes, and a feature of the second-type edge is determined based on the relevant information of the applicant object and the related persons thereof;

the confidence level is determined based on a number of nodes and edges included in the associated information graph, the number of nodes and edges included in the associated information graph is determined based on a hopping relationship between a node corresponding to the applicant and other nodes and edges in the associated information graph that are directly and non-directly connected to the node corresponding to the applicant.

8. The risk assessment system of claim 7, wherein the related information includes at least one of housing information, life consumption information, public transportation information, loan information, and basic information; and the basic information includes at least one of ID number, name, age and occupation.

9. The risk assessment system of claim 8, wherein the public transportation information includes: a public transportation riding situation when a road section is congested.

10. The risk assessment system of claim 8, the life consumption information includes life track information, and the management platform is further configured to generate a life feature vector based on the life track information, the life feature vector being used to determine the life similarity, wherein the life feature vector includes at least one of a number of times to go to each type of place, average stay time at each type of place, and a proportion of high-consumption places.

11. The risk assessment system of claim 7, wherein each of the feature nodes comprises: at least one of an age node, an occupation node, a public transportation node, a loan node, and a life consumption node; and the age node includes nodes of a plurality of preset age groups, and the occupation node includes nodes of a plurality of preset occupations.

12. A non-transitory computer-readable storage medium, comprising a set of instructions, wherein when executed by at least one processor, the risk assessment method of claim 1 is implemented.

\* \* \* \* \*